April 6, 1965    E. E. JENNINGS    3,176,330
COOLANT DISCHARGE DEVICE FOR CUTTING TOOL
Filed Dec. 6, 1962    4 Sheets-Sheet 1
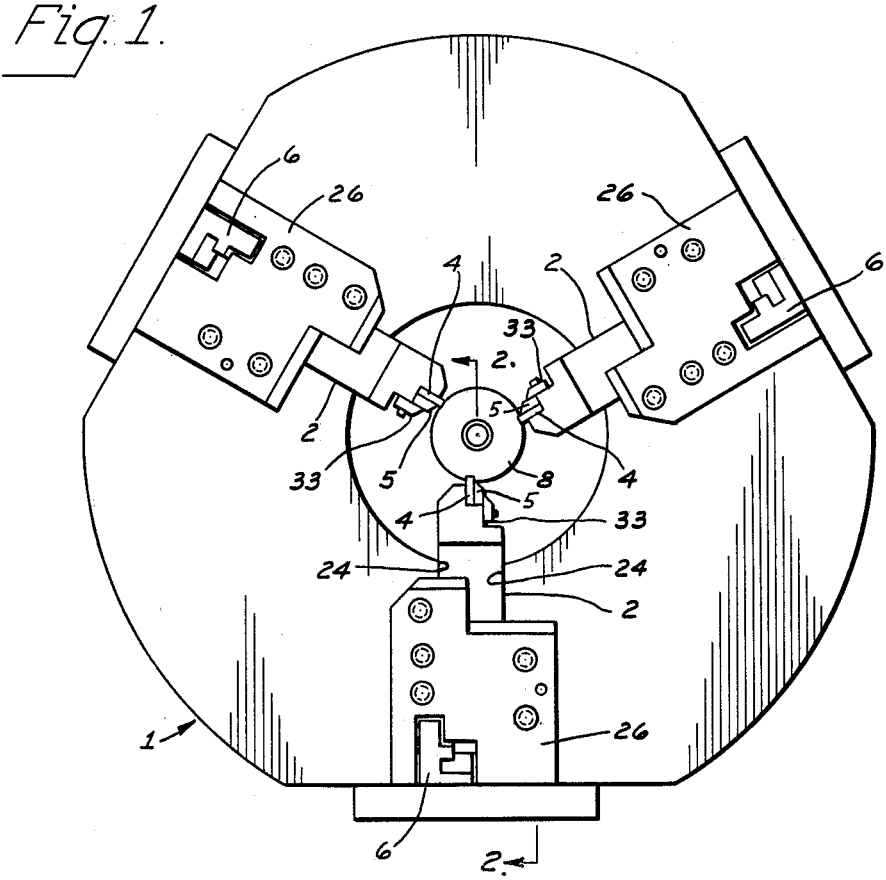
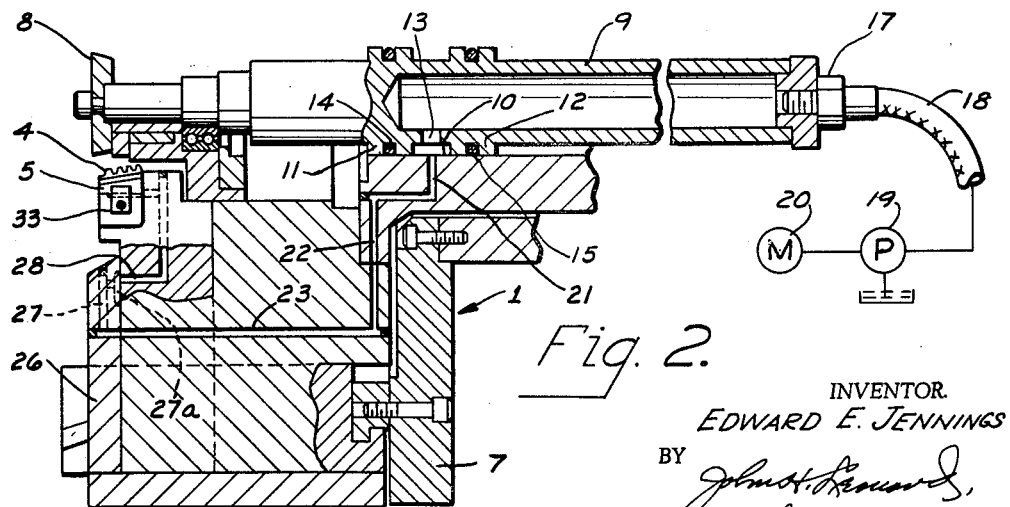
INVENTOR.
EDWARD E. JENNINGS
BY
his ATTORNEY.

April 6, 1965
E. E. JENNINGS
3,176,330
COOLANT DISCHARGE DEVICE FOR CUTTING TOOL
Filed Dec. 6, 1962
4 Sheets-Sheet 2
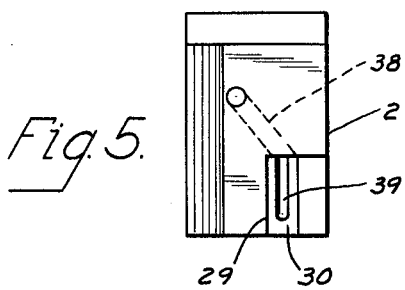
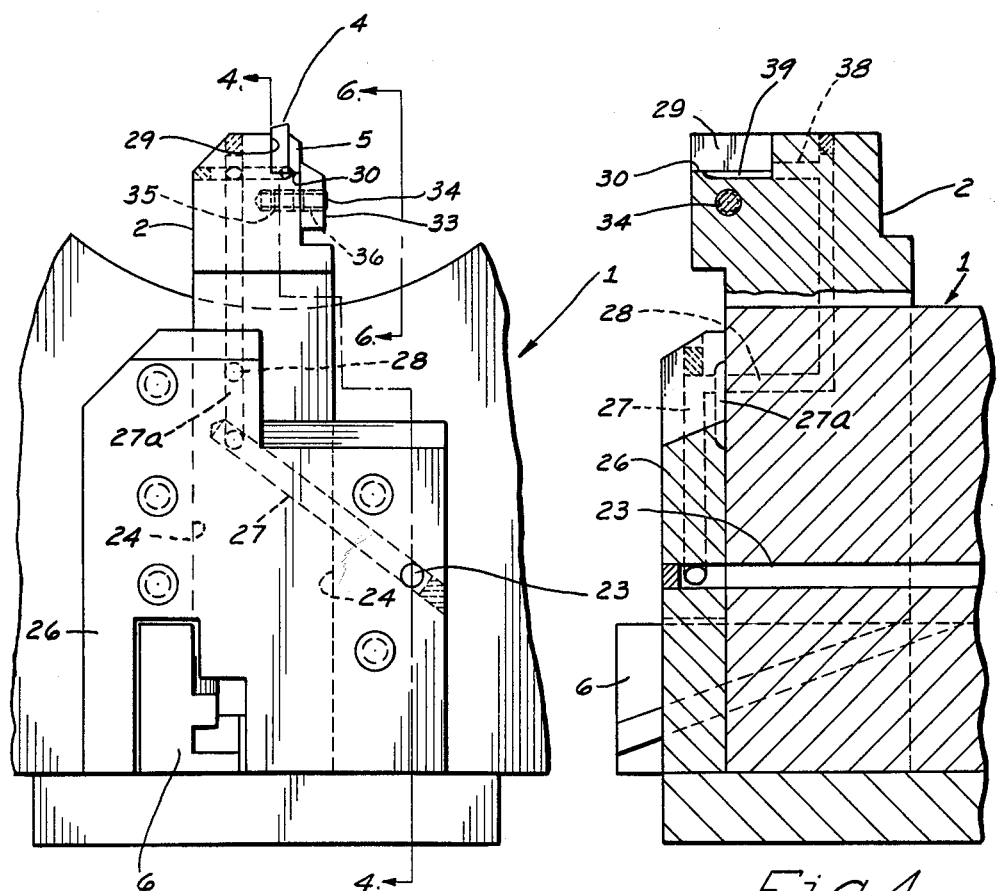
INVENTOR.
EDWARD E. JENNINGS
BY
*his* ATTORNEY.

April 6, 1965 E. E. JENNINGS 3,176,330
COOLANT DISCHARGE DEVICE FOR CUTTING TOOL
Filed Dec. 6, 1962 4 Sheets-Sheet 3
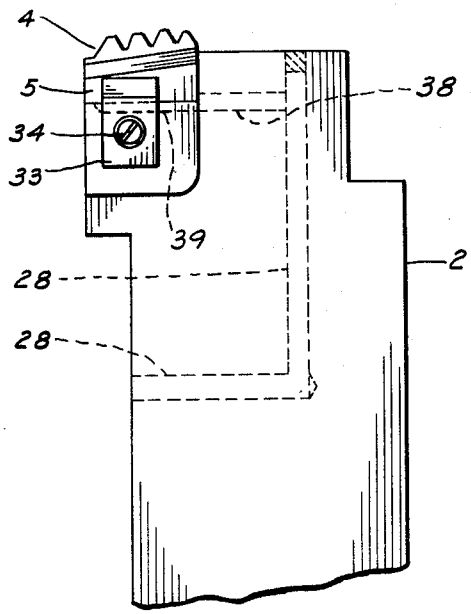
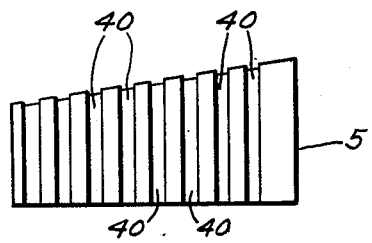
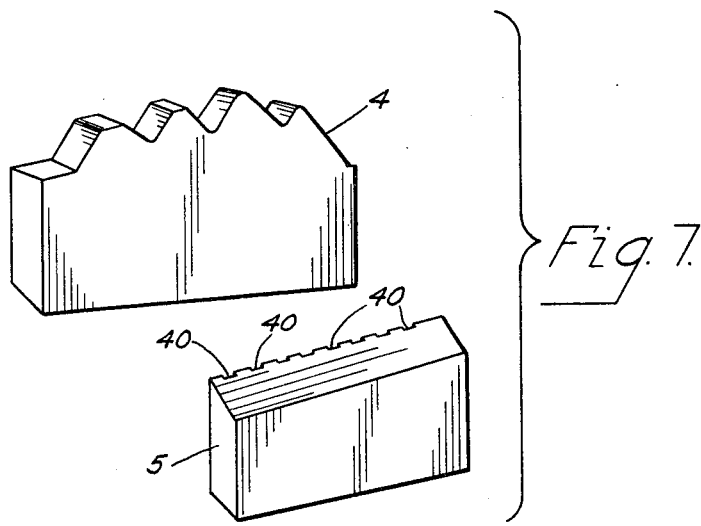
INVENTOR.
EDWARD E. JENNINGS.
BY
his ATTORNEY.

April 6, 1965 E. E. JENNINGS 3,176,330
COOLANT DISCHARGE DEVICE FOR CUTTING TOOL
Filed Dec. 6, 1962 4 Sheets-Sheet 4
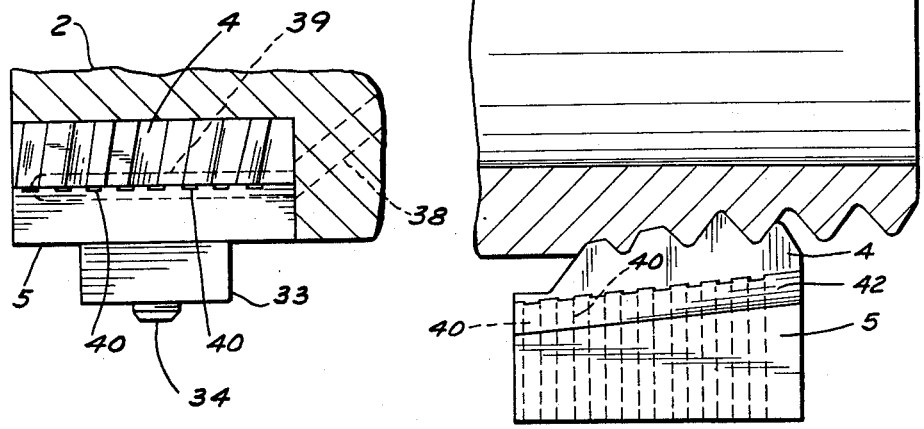
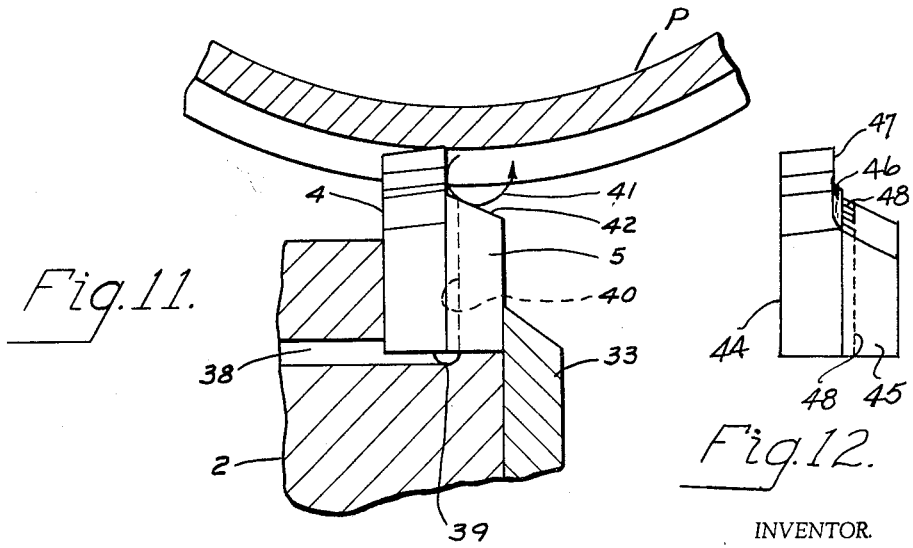
INVENTOR.
EDWARD E. JENNINGS
BY
his ATTORNEY

United States Patent Office 3,176,330
Patented Apr. 6, 1965

3,176,330
COOLANT DISCHARGE DEVICE FOR CUTTING TOOL
Edward E. Jennings, Cleveland, Ohio, assignor to The Pipe Machinery Company, Wickliffe, Ohio, a corporation of Ohio
Filed Dec. 6, 1962, Ser. No. 242,786
4 Claims. (Cl. 10—106)

This invention relates to a coolant applying device for metal cutting tools, and particularly to a coolant applying device which is operable to discharge coolant continuously directly onto the cutting edge of a metal cutting tool between the leading face of the tool and the rear face of the chips being formed by the tool.

More specifically, the invention relates to a clamp means which, in addition to holding the tool in operating position on its carrier, functions as the coolant applying device and has an outlet closely adjacent the cutting edge for discharging the coolant directly on the cutting edge.

Another object is to provide a combined clamp and coolant applying device which conducts the coolant in intimate heat exchange relation to the tool body prior to discharging the coolant onto the cutting edge.

For purposes of illustration, the invention is disclosed herein as applied to a carbide thread cutting chaser which is clamped into place in a carrier block by clamping means comprising a movable clamp member and a chip breaker interposed between the clamp member and the leading face of the chaser.

The chaser carrier block and clamp means illustrated are particularly adapted for mounting in a die head of the general character disclosed in U.S. Patent No. 2,679,057 of Neil T. Sawdey, issued May 27, 1954. The device also is adapted for use in a chaser support such as disclosed in the copending application of Edward E. Jennings, Serial No. 87,926, filed February 8, 1961, now U.S. Patent No. 3,126,560 issued March 31, 1964.

As more fully described in the above patent, a plurality of carbide chasers are mounted in a rotary spindle head and are rotated concurrently at relatively high speeds about the axis of a pipe or workpiece during the threading operation. Consequently, they become very hot. In such machines, coolant is supplied to the pipe and chases during the threading operation. Usually, the coolant is applied through directional discharge ports spaced substantial distances from the tool and arranged to flood the cutting throat. Even if the ports are directed toward the respective chasers in starting positon of the chasers, the coolant streams remain fixed as the chasers advance and recede so that the coolant streams are no longer accurately directed onto the chasers. However, such flooding causes much of the coolant to strike the mass of chips which have been cut loose and accumulated in the throat so that much of its heat absorbing capacity is dissipated wastefully before it reaches the chasers, and so that its path to the tool itself is frequently obstructed to such a degree that the tool does not receive as much coolant as desirable at the cutting edge.

In accordance with the present invention, instead of flooding the throat and chips accumulated therein with coolant, thereby causing a hit or miss application of the coolant to the cutting edges of the chasers, the coolant is first passed in intimate heat exchange relation to the leading face of the chaser and then discharged directly onto the cutting edge at the leading face behind those chips which are then in the process of being cut and deflected by the chaser and chip breaker. This manner of application has the advantage not only of continuously applying to the cutting edge where the heat is greatest more coolant than is applied thereto by flooding, but also of continuously washing the leading face of the chaser so as to reduce the temperature of the chaser body whereby the body itself assists in conducting heat away from the cutting edge. Further, the invention assures that the heat absorbing capability of the coolant is used efficiently and not dissipated and wasted in removing heat from the accumulated mass of already formed chips which have moved in the leading direction relative to the chaser beyond the chips then in the process of formation.

Various other objects and advantages of the invention will become apparent from the following description wherein reference is made to the drawings, in which:

FIG. 1 is a fragmentary front elevation of a part of a die head, with a chaser, carrier block, and clamping means, including a chip breaker, of the present invention installed therein;

FIG. 2 is a fragmentary vertical sectional view of the die head and is taken on the line 2—2 in FIG. 1;

FIG. 3 is an enlarged fragmentary front elevation of a portion of the head and the lowermost one of the carriers and chasers of FIG. 1, showing in greater detail the coolant applying device and coolant ducts for supplying coolant to the chaser;

FIG. 4 is an enlarged fragmentary vertical sectional view, similar to FIG. 2, and is taken on the line 4—4 of FIG. 3;

FIG. 5 is a fragmentary top plan view of the carrier block illustrated in FIGS. 3 and 4;

FIG. 6 is a fragmentary right side elevation of the carrier block and the device, as viewed from line 6—6 in FIG. 3;

FIG. 7 is an enlarged exploded perspective view of the chaser and breaker, as viewed generally from the leading face of the chaser forming part of the device.

FIG. 8 is a rear view of the chip breaker illustrated in FIG. 7;

FIG. 9 is a top plan view of the chaser and breaker of FIG. 7, showing the clamping member holding the chaser and breaker in operating position, and part of the carrier block;

FIG. 10 is an elevational view of the chaser and breaker of FIG. 9, viewed from the leading face of the chaser, the clamping means being omitted for clearness in illustration, and a fragment of a pipe being threaded shown in connection therewith;

FIG. 11 is a left end elevation of the device and part of the carrier block of FIGS. 9 and 10, showing its cooperation with the pipe and the manner in which the coolant is delivered to the leading face and cutting edge of the chaser, a portion of the carrier block, clamp, and pipe being shown in section for clearness in illustration; and FIG. 12 is an end elevation of a modified form of chaser associated with a chip breaker such as disclosed in FIGS. 1–11.

Referring first to FIGS. 1 and 2, the invention is shown in connection with a rotary die head 1 which may be of the general character illustrated in the above identified patent. A plurality of chaser carrier blocks 2 are mounted in the head for reciprocation radially toward and away from the rotational axis of the head. Mounted on each of the blocks 2 is a carbide chaser 4. Chip breakers 5 are provided for the chasers, and, in the illustrative example, the chip breakers also form part of the clamping means for clamping the chasers fixedly in positon in their respective carrier blocks.

Since all of the chaser and block assemblies are essentially the same in form and function, as also is the relation of the chasers to their associated chip breakers, only the chaser and block assembly lowermost in FIG. 1 will be described in detail.

As disclosed in the above patent, each of the carrier blocks 2 is arranged in the head 1 for radial movement and is caused to advance or recede during thread cutting in predetermined relation to the relative axial advance of the pipe or workpiece and head. This movement of the chasers is effected by a common wedge member 6. The member 6 is rotatable with the head and operated by a suitable control member 7 which also is rotatable with the head. The movement of the control member 7 generally is controlled by a conventional sine bar, not shown, the movement of which is controlled, in turn, by a pipe stop 8 mounted on a tube 9. The tube 9 is not rotatable with the head but is axially movable relative thereto.

The head 1 has an axial bore 10 in which the tube 9 is disposed in spaced relation to the bore walls. At one point along its length the rod is provided with annular shoulders 11 and 12 with a discharge port 13 disposed therebetween. O-rings, such as indicated at 14 and 15, are provided at opposite sides of the port 13 and bear against the adjacent faces of the shoulders, respectively.

Coolant under pressure is supplied to that end of the tube 9 opposite from the stop 8 through a fitting 17 and hose 18. The hose is connected to a coolant pump 19 driven by a motor 20, as diagrammatically shown in FIG. 2. The coolant discharges through the port 13 into the annular space between the two O-rings 14 and 15 and thence into a duct 21 in the head 1. The duct 21 leads into a duct 22 which is connected to a longitudinal duct 23 in the head. The carrier block 2 is mounted for sliding movement radially in the head in a suitable radial guideway 24 and is held in place in the guideway by a front plate 26 which is fixedly connected to the head with its rear face in sliding contact with the block 2.

The front plate 26 has a duct 27 which connects with the duct 23 at one end. The duct 27 has a channel portion 27a at the other end. The channel portion 27a is open at the face of the front plate which engages the block 2 and is elongated radially of the head. The block 2 has a duct 28 which at one end continuously communicates with the channel in all radial positions of the block 2. By this arrangement, coolant fluid can be supplied continuously from the rear end of the spindle head through the head and into the block 2.

The fit of the block 2 in its guideway and against the hear face of the associated front plate 26 is with a tolerance of plus or minus .0002 of an inch. The pressure of the coolant supplied may be from about 100 p.s.i., upwardly. With such clearances and pressure, packing seals are not required between the block 2 and guideway 24, or between the block 2 and the rear face of the front plate 26. The small leakage of coolant is negligible insofar as concerns cooling.

As best illustrated in FIG. 3, the block 2 has a radially extending anvil 29 facing in the leading direction of cutting and a supporting shoulder 30 which preferably is planar and lies in a plane normal to a radius through the axis of rotation of the head and at a right angle to the leading face of the anvil. The chaser 4 is disposed with its trailing face against the anvil and the edge opposite its cutting edge seated on the shoulder 30.

Means are provided on the block 2 for clamping the chaser 4 in place. In the form illustrated, the clamping means comprise a clamping jaw of two members. One member may be in the form of the spacer or chip breaker 5 having one face juxtaposed against the leading face of the chaser 4 and having its lower edge resting on the shoulder 30. The other member is a movable clamping member 33. The member 33 engages the leading face of the chip breaker 5 near the base and presses it firmly against the leading face of the chaser 4 and thereby clamps the chaser 4 firmly against the anvil 29 with its non-cutting edge resting on the shoulder 30.

The clamping member is operated by a suitable screw 34 having right-hand threads in threaded engagement with a threaded bore 35 in the block and left-hand threads in threaded engagement with the bore 36 in the clamp member 33. Thus, upon turning the screw in one direction, the clamp member 33 is drawn firmly against the chip breaker 5 and upon turning of the screw in the opposite direction, the clamp member 33 is released therefrom. The duct 28 in the block 2 connects with an outlet duct 38 therein. The duct 38 extends transversely of the block 2 and terminates at its outlet in an elongated open sided trough 39 in the shoulder 30 and which trough extends lengthwise of the chaser and chip breaker. Its open side lies at the plane of the juxtaposed forward or leading face of the chaser and rear or trailing face of the chip breaker and extends substantially the full length of the breaker. The coolant fluid is delivered under pressure into the trough 39 and thereby along the entire juncture of the juxtaposed faces of the chaser and chip breaker. In order to carry this coolant to the cutting edge at the leading face of the chaser and apply it to the cutting edge between the rear of the chips being formed and the leading face of the chaser, suitable duct means are provided at the juxtaposed faces and have outlets at the edge of the breaker nearest to the cutting edge of the chaser. In the form illustrated, the duct means are in the form of a row of channels 40. The channels 40 preferably are formed in the rear face of the chip breaker and extend from one edge entirely to the other edge thereof. They are open at both ends and have their open sides facing the leading face of the chaser and substantially closed thereby. Preferably the channels 40 are in close laterally spaced relation to each other in the row, and the row extends endwise of the breaker. They are distributed so that coolant is supplied along the entire leading face of the chaser. Such channels, so arranged, conduct coolant from the trough 39 along and in intimate heat exchange relation to the chaser, and discharge it at the edge of the chip breaker adjacent the cutting edge of the chaser. Thereby the coolant removes heat from the main body of the chaser preliminary to contact with the cutting edge.

If desired, channels can be provided in the leading face of the chaser, but this is not as desirable as an additional operation would have to be performed on each chaser which must be replaced more often than the chip breaker and remainder of the clamping means.

Thus a combination of a cutting tool, a carrier therefor, and clamping means for the tool are provided and so arranged that coolant fluid is applied continuously directly to the cutting edge at the leading face of the tool to the rear of the chips in the process of being formed. This coolant is continuously directed exactly where required regardless of the advanced or retracted position of the tool radially.

The channels 40 are preferably relatively wide and shallow. In the illustrative example, they are about 0.008–.015 of an inch in depth in a direction normal to the face of the chaser and about 0.0625 of an inch in width, and are spaced about 0.0625 of an inch apart. The size and spacing may be varied, but the depth must be such that they can discharge the coolant properly without becoming jammed by the chips and metal fragments.

It is to be noted, as illustrated in FIG. 11, that the chips, indicated by the arrow 41 move from the cutting edge toward the base of the chaser and strike the deflecting surface 42 of the chip breaker 5. The surface 42 curls them forwardly away from the leading face of the chaser 4. Obviously, the coolant can flow to the cutting edge substantially at the point at which the chip is being formed. Thus, instead of the coolant having to pass through the chips and the like and lose much of its heat absorbing capacity by cooling chips already out of the way of the chaser, the coolant in the present instance cools the chaser first, and thens passes to the chips for further cooling of the chips. Further, the coolant urges the chips away from the chaser at their inception and has little or no tendency to carry or hold any of them back against the chaser. It is readily apparent from the foregoing that much more efficient cooling of the chaser cutting edge is provided.

Referring to FIG. 12, there is shown a chaser 44, corresponding to the chaser 4, and a chip breaker 45 corresponding to the chip breaker 5. The chaser 44 is one having a small step on its leading face 47. The step extends the full length of the chaser and generally parallel to, and slightly above, the upper edge of the chip breaker, so that the face 47 about the ledge is offset from the plane of the juxtaposed faces of the chaser and breaker. This step 46 is such that the chips which may travel downwardly along the leading face 47 of the chaser are curled forwardly slightly and deflected so that they do not directly enter coolant channels 48 of the chaser.

While I have disclosed the invention as applied to a thread chaser as a cutting tool, a chaser carrier block as a tool support, and a chip breaker and clamping member as the clamping means, it is apparent that the invention is equally applicable to other types of cutting tools, supports, and clamping means. For example, the invention is well adapted to a cutting tool and support such as disclosed in the heretofore identified copending application.

Also, in the description of the invention, it is noted that the invention is described as applied to a rotary tool head carrying a chaser and chip breaker. However, in its broader aspects, it is applicable to a stationary tool head for carrying a tool against which the work piece is rotated with or without a chip breaker.

Having thus described my invention, I claim:

1. In a metal cutting machine tool and carrier combination, a rotary head, a tool carrier mounted thereon for reciprocation radially thereof and having a notch with its base defining a supporting wall and its side defining an anvil wall angularly disposed relative to the supporting wall and facing forwardly in the direction of rotation, a coolant supply trough in the supporting wall, a carbide tool having a planar leading face with a cutting edge in the plane of the leading face, and having another edge spaced from said cutting edge and resting on said supporting wall, said tool having a trailing face juxtaposed against the anvil wall, a chip breaker having a trailing face juxtaposed against said leading face of the tool and having one edge resting on the supporting wall, another edge of the breaker being near to, but spaced from, the cutting edge and being beveled in a direction away from the trailing face of the breaker forwardly and toward said other edge of the breaker, a row of open-sided shallow channels in the chip breaker with their open sides in its said juxtaposed trailing face and substantially closed by the said juxtaposed leading face of the tool, and said channels being spaced laterally from each other endwise of the cutting edge and extending transversely of said trailing face and being open at their opposite ends, said channels having the ends nearest the cutting edge opening through said beveled edge of the breaker, in closely spaced relation to each other endwise of the row for discharging coolant across, and in contact with, the leading face of the tool directly to the entire cutting edge, each channel having its other end in communication with said trough, means for supplying coolant under pressure into said trough, and means for clamping the tool and breaker in position on the carrier.

2. A chaser and chip breaker combination comprising a chaser in the form of an elongated carbide body having at one lateral edge cutting teeth arranged in a row extending endwise of the body, said body having a planar leading face and the cutting edge of the teeth being coplanar with said leading face, a chip breaker in the form of an elongated metal body having a planar trailing face juxtaposed against the leading face of the chaser and having one lateral edge disposed near to the root line of the teeth but spaced therefrom in a direction toward the opposite lateral edge of the chaser, said one lateral edge of the breaker being beveled, in a direction forwardly from the trailing face of the breaker and toward the opposite edge of the breaker to provide a chip deflecting surface, said bodies being adapted for clamping together firmly in said face to face juxtaposition, said breaker body having a plurality of shallow open-sided channels arranged in laterally spaced relation to each other in a row which extends endwise of the bodies, said channels having their open sides in the trailing face of the breaker body, said channels extending from said beveled edge toward the opposite lateral edge of the breaker body and being open for discharge of coolant at the ends adjacent the teeth, through said beveled edge, said open discharge ends being in closely spaced relation to each other endwise of the row and shaped to discharge coolant across, and in contact with, the leading face of the chaser toward the cutting edge along the entire cutting edge across, and in contact with, the leading face of the chaser, and the opposite ends of all of the channels being adapted for connection to a common coolant supply manifold while the chaser and breaker are so juxtaposed.

3. An apparatus according to claim 2 wherein each of said channels is from about 0.008 inch to 0.015 inch in depth.

4. An apparatus according to claim 3 wherein each of said channels is about 0.0625 inch in width.

References Cited by the Examiner
UNITED STATES PATENTS 2,848,790   8/58   McMann _____ 29—106
2,954,570   10/60  Couch _____ 10—106

References Cited by the Applicant
UNITED STATES PATENTS 2,679,057   5/54   Sawdey.
3,126,560   3/64   Jennings.

ANDREW R. JUHASZ, *Primary Examiner.*

WILLIAM W. DYER, JR., *Examiner.*